United States Patent [19]

Howng

[11] Patent Number: 4,620,438
[45] Date of Patent: Nov. 4, 1986

[54] CYLINDER PRESSURE TRANSMITTER FOR AN INTERNAL COMBUSTION ENGINE

[75] Inventor: Wei-Yean Howng, Attleboro, Mass.

[73] Assignee: Texas Instruments Incorporated, Dallas, Tex.

[21] Appl. No.: 561,842

[22] Filed: Dec. 15, 1983

[51] Int. Cl.$^4$ ............................................. G01L 23/22
[52] U.S. Cl. ........................................ 73/35; 73/115; 310/338
[58] Field of Search ................... 73/35, 115, 723, 754; 123/425, 435; 310/338

[56] References Cited

U.S. PATENT DOCUMENTS

| | | | |
|---|---|---|---|
| 2,096,826 | 10/1937 | Schrader | 177/351 |
| 2,190,713 | 2/1940 | Hintze et al. | 123/169 |
| 2,454,264 | 11/1948 | Stigter | 171/327 |
| 2,655,043 | 10/1953 | Wolfe et al. | 73/115 |
| 2,917,642 | 12/1959 | Wright et al. | 310/8.3 |
| 3,269,175 | 8/1966 | Sprosty | 73/141 |
| 3,313,962 | 4/1967 | Sonderegger | 310/338 |
| 3,461,327 | 8/1969 | Zeiringer | 310/8.9 |
| 3,495,102 | 2/1970 | List et al. | 310/338 |
| 3,566,163 | 2/1971 | Fischer et al. | 310/8.3 |
| 3,602,744 | 8/1971 | Hugli | |
| 3,783,309 | 1/1974 | Ailbert et al. | 310/8.7 |
| 3,857,287 | 12/1974 | Sonderegger et al. | 73/395 |
| 3,960,018 | 6/1976 | Change et al. | 73/754 |
| 3,983,077 | 12/1976 | Howng | |
| 4,021,688 | 5/1977 | Kudinov et al. | 310/8.7 |
| 4,266,421 | 5/1981 | McDougal | 73/35 |
| 4,286,687 | 9/1981 | Fiske | 310/338 |

FOREIGN PATENT DOCUMENTS 57-48629  3/1982  Japan .
57-72040  5/1982  Japan .

OTHER PUBLICATIONS

R. J. Hosey and J. D. Powell, "Closed Loop, Knock Adaptive Spark Timing Control Based on Cylinder Pressure," Transactions of the ASME, vol. 101, pp. 64-70 (Mar. 1979).

Edward F. Obert, "Internal Combustion Engines and Air Pollution," Chapter 9, Harper and Row Publishers, N.Y. (1973).

K. W. Randall and J. D. Powell, "A Cylinder Pressure Sensor for Spark Advance Control and Knock Detection," SAE Technical Paper Series, 790139 (1979).

Application Note, "Hybrid Integrated Circuit Applications," Amicon Corporation.

Brochure, "Ceramic Chip Capacitors," Monolithic Components Corporation.

Weber et al., *Electrical Measurement Systems for Biological and Physical Scientists*, 1975, pp. 336-339.

Primary Examiner—Stewart J. Levy
Assistant Examiner—John E. Chapman, Jr.
Attorney, Agent, or Firm—James P. McAndrews; John A. Haug; Melvin Sharp

[57] ABSTRACT

An improved cylinder pressure transmitter provides an electrical signal corresponding to pressure in a cylinder of an automotive internal combustion engine during engine operation and furnishes the signal to computer control means for use in regulating spark advance to improve engine efficiency and performance and reduce engine knocking. The pressure transmitter includes means for mounting piezoelectric means in sealed relation to an engine cylinder to be responsive to variations in cylinder pressure during engine operation to provide initial electrical signals representative of pressure variations in the cylinder and includes high temperature electronic means carried by the mounting means and electromagnetically shielded with the piezoelectric means within the mounting means for amplifying those initial signals to provide low impedance signals for transmission to computer control means at a location remote from the cylinder.

5 Claims, 11 Drawing Figures

CYLINDER PRESSURE TRANSMITTER FOR AN INTERNAL COMBUSTION ENGINE

BACKGROUND OF THE INVENTION

The field of this invention is that of pressure sensors and the invention relates more particularly to a cylinder pressure transmitter responsive to variations in pressure within a cylinder in an internal combustion engine during engine operation to provide an electrical control signal for use in regulating engine operation.

It has been proposed that variations in pressure in the cylinder in an internal combustion engine be sensed during engine operation for furnishing an electrical signal to a control computer means or the like for use in regulating engine operation to achieve improved fuel efficiency and operating performance while also reducing engine knocking. In one proposed arrangement for example, a piezoelectric ring element is disposed in a sparkplug well on an engine so that when a sparkplug is mounted in the well in an otherwise conventional manner to bear against the ring element with a selected initial force, the variations in cylinder pressure which occur during piston cycling are transmitted to the piezoelectric element as variations in force applied to the element. The element accordingly provides an electrical signal corresponding to the variations in cylinder pressure. It has been proposed that the signal be used in conjunction with crank angle sensing means to determine peak cylinder pressure and to determine high frequency variations in the cylinder pressure due to engine knocking to provide feedback to the computer means for adjusting spark advance to assure that peak cylinder pressure occurs at the optimum crank angle consistent with desired reduction in engine knock.

However, it is found that such piezoelectric pressure sensing means are difficult to mount to be reliably responsive to cylinder pressure variations during engine operation over a long service life and that they tend to provide weak, high impedance output signals which have not been suitable for use with computer control means for regulating operation of internal combustion engines in commercial automotive applications.

BRIEF SUMMARY OF THE INVENTION

It is an object of this invention to provide novel and improved cylinder pressure sensing means; to provide such a sensing means comprising a cylinder pressure transmitter; to provide such a pressure transmitter which is adapted for reliable use over a long service life; to provide such a pressure transmitter which furnishes strong, low impedance output signals properly representative of variations in cylinder pressure during engine operation for transmission to computer control means at a location remote from the cylinder; and to provide such a pressure transmitter which is suitable for use with computer control means and crank angle sensing means and the like for achieving improved efficiency and performance of an internal combustion engine with desired avoidance of engine knocking.

Briefly described, the novel and improved cylinder pressure sensing means of this invention comprises a cylinder pressure transmitter incorporating piezoelectric means which provide an electrical signal in response to application of pressure thereto. Preferably the piezoelectric means comprises a pair of selected, high temperature ceramic piezoelectric discs of doped lead zirconium titanate or lead metaniobate or the like which are disposed on opposite sides of a common electrode with the discs polarized in opposite directions. Preferably the discs are also laterally sheathed in a tube or sleeve of temperature resistant, electrically isolating material such as tetrafluoroethylene polymer (Teflon) or the like having a low elastic constant.

The transmitter also includes means for mounting the piezoelectric means so that the piezoelectric means is easily and reliably disposed in sealed relation to a cylinder of an internal combustion engine to be responsive to variations in cylinder pressure during engine operation. Preferably the mounting means comprises a sparkplug-like body having a tubular opening or the like, having a diaphragm of selected flexibility such as stainless steel or the like welded or otherwise secured over the opening and having one end of the piezoelectric means disposed against one side of the diaphragm, having backing or support means mounted on the body against an opposite end of the piezoelectric means, and having screw means for mounting the body in an opening in a wall of an engine cylinder in sealed relation thereto for exposing an opposite side of the diaphragm to pressures within the cylinder via the tubular opening. Preferably the diaphragm is arranged to bear against the piezoelectric means for providing a selected preload thereon.

The transmitter further includes electronic means which are carried by the mounting means and are electromagnetically shielded with the piezoelectric means within the mounting means for amplifying the electrical signal provided by the piezoelectric means, thereby to provide a low impedance signal suitable for transmission to computer control means or the like at a location remote from the engine cylinder. Preferably the electronic means comprises hybrid circuit means having passive circuit means such as capacitor means and resistor means and active circuit means operable at high temperature over a long service life. Preferably for example, the hybrid circuit means comprises a ceramic substrate or the like directly mounting passive circuit components such as thick film resistor means and capacitor means of tantalum oxide or ceramic materials or the like suitable for use a temperatures in the range of 175° C. or above. The electronic means then further incorporates active components such as voltage converting and amplifying means and the like in high temperature integrated circuits such as i.c. units having dielectrically isolated circuit components and the like, thereby adapting the hybrid circuit means for high temperature operations.

In that way the novel and improved cylinder pressure transmitter of this invention is adapted for convenient and reliable use over a long service life. The piezoelectric means provided in the pressure transmitter furnish an initial signal of relatively low impedance and that signal is shielded and properly amplified for providing a signal representative of variations in cylinder pressures during the full engine cycle suitable for transmission to computer control means or the like at a location remote from the engine cylinder. The pressure transmitter is also of simple, rugged and reliable construction and is adapted for widespread use in commercial automotive applications.

DESCRIPTION OF THE DRAWINGS

Other objects, advantages and details of the novel and improved cylinder pressure transmitter of this invention appear in the following detailed description of preferred embodiments of the invention, the detailed description referring to the drawings in which.

DESCRIPTION OF THE PREFERRED EMBODIMENTS

Figure 1:
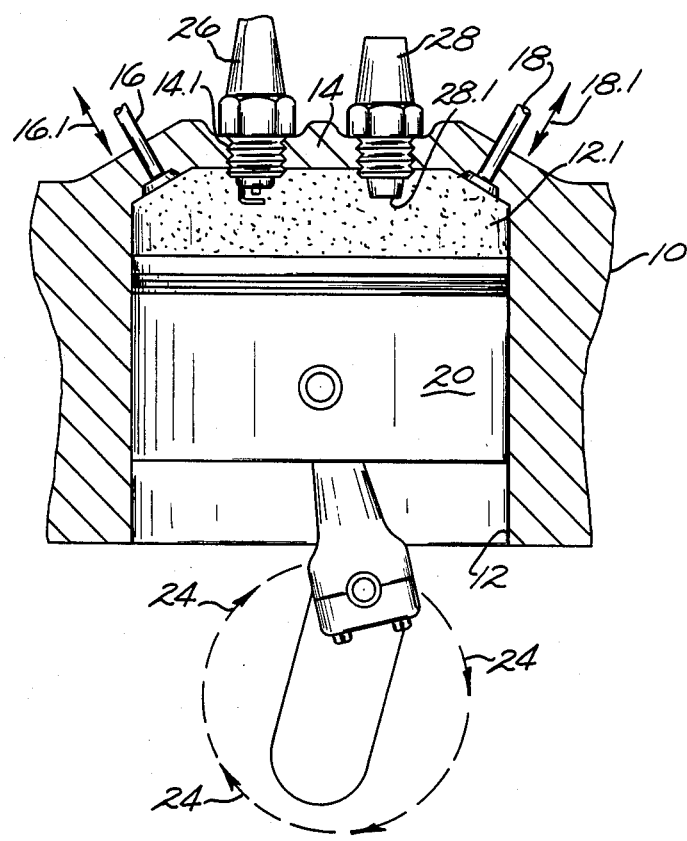
FIG. 1 is a diagramatic section view illustrating mounting of the cylinder pressure transmitter of this invention in sealed relation to a cylinder in an internal combustion engine.

Referring to the drawings, 10 in FIG. 1 diagramatically indicates a conventional internal combustion engine having a cylinder 12 with a wall 14 and having fuel intake valve means 16 and exhaust valve means 18 mounted in a cylinder wall to be movable as indicated by arrows 16.1 and 18.1 in conventional manner. A piston 20 is connected to a crankshaft 22 which is movable in the direction indicated by the arrows 24 to cycle the piston through intake, compression, power and exhaust strokes or the like in conventional manner. The piston is illustrated near the start of its power stroke in FIG. 1. For clarity of illustration, the air-fuel mixture compressed in the cylinder combustion chamber 12.1 is illustrated by stippling in FIG. 1 without indicating any firing or the like occurring in the chamber. Conventional sparkplug means 26 are mounted in a well 14.1 in the cylinder wall in sealed relation to the cylinder in conventional manner and a cylinder pressure transmitter 28 in accordance with this invention, preferably having a size and outer configuration generally corresponding to that of a sparkplug, is also mounted in a well 14.2 in a cylinder wall in sealed relation to the cylinder so that an end 28.1 of the transmitter is exposed to pressure conditions within the combustion chamber of the cylinder.

Figure 2:
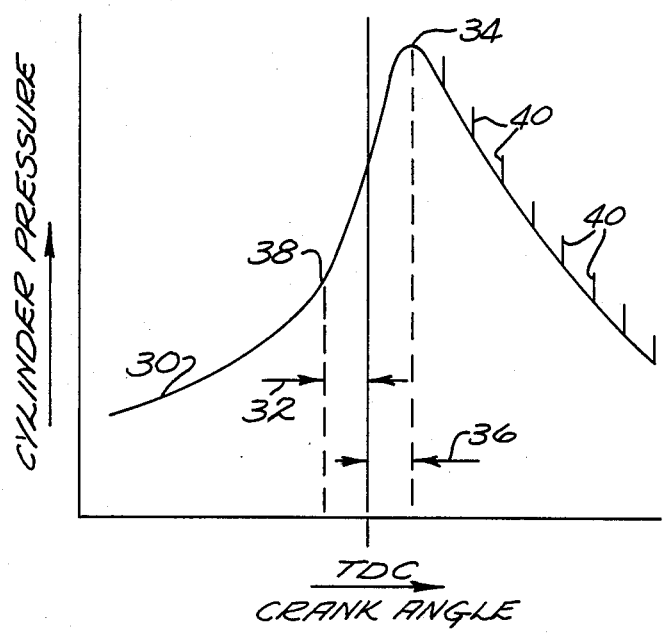
FIG. 2 is a graph illustrating pressure conditions typically occuring in a cylinder as shown in FIG. 1.

It will be understood that the spark advance provided for a spark ignition engine is an important control which intimately affects performance of the engine. In that regard, the optimum spark advance for a given engine design varies during engine operation depending upon speed, type of fuel, throttle condition, atmospheric condition and engine load and the like. However, the spark advance is intended to provide a peak pressure in the cylinder at the same piston position in the cylinder on each stroke, that piston position representing the crank angle at which the pressure is adapted to provide maximum torque for the engine. It is known that optimization of fuel efficiency and engine performance might be achieved for a spark ignition engine by detecting the peak pressure position in an engine cylinder during each engine cycle and by controlling spark advance with reference to crank angle sensing means (not shown) through closed loop electronic feedback. In that way, sparking is regulated to occur at a selected point in each piston cycle to assure that peak pressure occurs in the cylinder at the maximum torque angle for the engine. That is, as pressure within the cylinder varies with crank angle as is diagramatically illustrated by curve 30 in FIG. 2—the curve varying with variation in working conditions such as speed, load, etc. as noted above—the spark advance 32 before TDC (top dead center) piston position is desirably regulated by electronic feedback from a cylinder pressure sensor so that the spark 38 occurs at a selected point in the cycle such that peak cylinder pressure 34 always occurs at the same, maximum torque crank angle 36 for the engine.

It is also known that near the optimum spark advance position an engine typically tends to develop knocking combustion. The occurrence and timing of such knocking depends on factors such as fuel composition, engine load, and fuel charge motion within the cylinder and the like. Knocking combustion can lead to surface damage in the cylinder combustion chamber and on the pistons and accordingly it is known to reduce or avoid knocking by selected retarding of the spark advance from what might otherwise be considered the optimum spark advance position. In that regard, it is also known that knocking combustion is typically reflected by relatively high frequency variations in cylinder pressure as is diagramatically indicated in FIG. 2 by other pressure peaks 40. Accordingly it has been proposed that knock sensor means be provided to be responsive to pressure variations in an engine cylinder during engine operation for detecting the occurrence of high frequency pressure variations representative of knocking combustion and for sending a signal back to the spark timing circuit for controlling the spark advance to effectively eliminate the knocking. It has also been proposed that the same pressure sensor can be used for detecting peak cylinder pressure as well as for detecting high frequency pressure variations related to engine knocking.

It is an object of this invention to provide the novel and improved pressure sensing means 28 diagramatically illustrated in FIG. 1 for detecting peak pressure position and knocking pressure variations in an effective and reliable manner. In that regard, the pressure sensing means 28 preferably comprises a cylinder pressure transmitter which is stable for use in a wide temperature range, preferably from −20° C. to 250° C.; which provides a standard analog voltage output; which has a high frequency response characteristic, preferably on the order of 20 to 24 KHz or greater to detect peak pressure position in a cylinder with resolution on the order of one degree of angle and to detect knocking frequencies on the order of 6 to 8 KHz or better; which is relatively insensitive to background vibration noise for use in an automotive environment; which is capable of withstanding exposure of a portion thereof to high combustion temperatures, typically on the order of 1,000° F.; which has a long pressure cycle life preferably on the order of 200 million pressure cycles; which is capable of sensing typical peak cylinder pressures on the order of 800 to 1,000 psi. or greater; which has a life expectancy on the order of 5,000 miles of automotive use or greater; and which is operable at conventional automotive voltage levels of 14 volts D.C.

Figure 3:
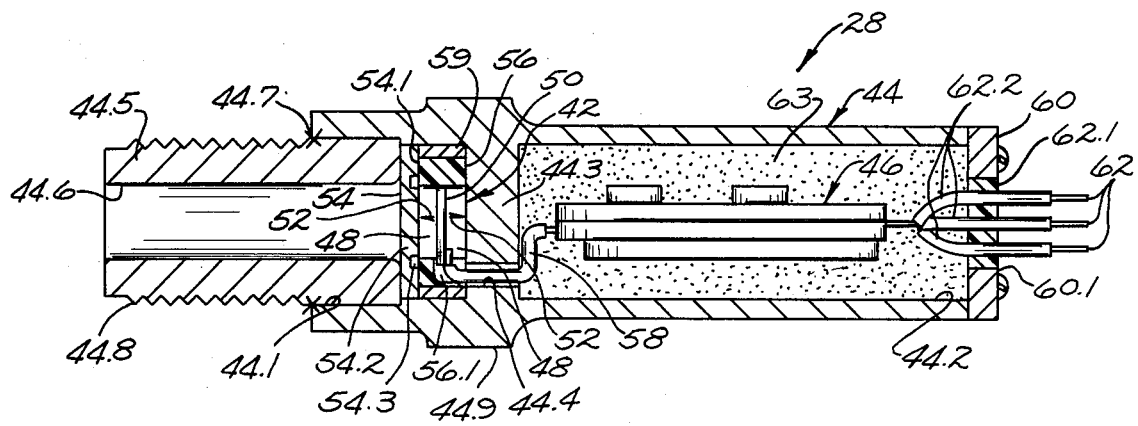
FIG. 3 is a diagramatic section view to enlarged scale along the longitudinal axis of a cylinder pressure transmitter of this invention.

In one preferred embodiment of this invention as illustrated in FIG. 3, the novel and improved cylinder pressure transmitter 28 of this invention comprises piezoelectric means 42 which are adapted to provide an electrical signal in response to application of pressure or compressive force thereto. The piezoelectric means are mounted on body means 44 which serve to mount the piezoelectric means in sealed relation to a cylinder of an internal combustion engine to be responsive to variations in cylinder pressure during cylinder operation for providing an initial electrical signal representative of the cylinder pressure. Electronic means 46 are also preferably carried by the mounting means 44 and provided common electromagnetic shielding with the piezoelectric means by the mounting means or the like for amplifying the initial signal provided by the piezoelectric means so that the signal is adapted to be reliably transmitted to a control computer means or the like (diagramatically illustrated at 47 in FIG. 4) at a location remote from the cylinder. The piezoelectric means 42 preferably comprises a pair of discs 48 of a ceramic piezoelectric material such as doped lead zirconium titanate or lead metaniobate or the like which has a relatively high Curie temperature above about 175° C. and a relatively low coefficient thermal expansion. The piezoelectric discs each have a metal contact layer (not shown) on opposite sides surfaces of the discs in conventional manner. Preferably the contact layers are of gold or the like to be stable at the noted high temperature. The discs are disposed on respective opposite sides of a conductor electrode 50 of a high conductivity material such as copper or the like so that a contact surface of each disc is abutted in electrically connected relation to the electrode conductor 50. The discs are polarized in opposite directions on opposite sides of the conductor electrode as indicated by the arrows 52 in FIG. 3 for providing an initial electrical signal comprising the combined charge output from the discs occuring in response to pressures applied to the discs along the pole axes while cancelling noise signal effects such as might be due to vibration forces and the like applied to the discs from other directions. In one preferred embodiment, the discs 48 comprise a chromium doped lead zirconium titanate material having an empirical formula of $Pb_{1.01}(Zr_{.53}Ti_{.47})O_3Cr_{.03}$, having a Curie temperature of about 370° C., having a relatively low coefficient of thermal expansion, and having a pressure response characteristic on the order of about $35 \times 10^{-3}$ V/N (volts per newton). In another preferred embodiment, an additional calcium dopant is incorporated in that noted material for improving pressure sensitivity. In another preferred embodiment, the discs 48 comprise a lead metaniobate material having a composition of $PbNb_2O_6$, having a Curie temperature of about 570° C., having a low thermal expansion coefficient, and having a pressure response characteristic of about $42 \times 10^{-3}$ V/N.

In a preferred embodiment of the invention, the mounting means 44 comprises a generally cylindical body 44 as shown in FIG. 3 so that the transmitter 28 is easily accommodated on a engine cylinder. Preferably a strong and stiffly flexible metal diaphragm 54 is arranged to protect the piezoelectric means 42 from the environment within the cylinder. Preferably also, the body 44 or other suitable means is formed of a steel material of the like and is arranged to provide electromagnetic shielding for the piezoelectric means 42 in the automotive environment where interference from adjacent high potential sparkplug firing and the like is likely to occur and to create noise in the signal output from the transmitter 28. Preferably the mounting means is also adapted to provide firm and positive backing support for the piezoelectric means as the diaphragm is exposed to high pressures occurring in the cylinder during engine firing.

In a preferred embodiment for example, the body member 44 is formed of cold rolled steel. The body, has a first bore 44.1 at one end, has a second bore 44.2 at an opposite end, has a support section 44.3 formed between the bores, and has a passage 44.4 which extends through the support section from one bore to the other. The piezoelectric discs 48 and the electrode conductor 50 are disposed within a sleeve 56 or a temperature resistant, electrically isolating, organic material such as Teflon or the like which has a low elastic constant. A wire lead 58 preferably having an insulating Teflon coating is connected to the electrode 50 and extends from the electrode via a groove 56.1 formed in the inside of Teflon sleeve 56. The discs are then further disposed within a metal spacer sleeve 59 or the like of selected length and are disposed within the body bore 44.1 so that a metal contact layer (not shown) on one end of one of the discs 48 bears against the support section 44.3 of the body in electrical engagement with that section. The wire lead 58 is arranged to extend through the passage 44.4 to connect the electrode 50 to the electronic means 46 as will be understood. The diaphragm 54 is disposed within the bore or recess 44.1 to bear against the other disc 48 and to electrically engage a metal contact layer (not shown) on that other disc. A tubular bushing 44.5 or the like having a central opening 44.6 is also fitted into the bore 44.1 to bear against the diaphragm. The bushing is pressed to a desired position in the bore to bear against the rim 54.1 of the diaphragm. To seat the diaphragm rim against the spacer sleeve 59 and preferably to apply a selected degree of preload compressive force to the piezoelectric disc 48 through the diaphragm. The bushing is then secured at that desired position by welding as indicated at 44.7 or in other conventional manner. Preferably for example that preload corresponds to at least the compressive force which would be applied to the piezoelectric means 42 by application of a fluid pressure of one atmosphere to the diaphragm 54. The bushing 44.5 is preferably threaded as indicated at 44.8 to be threaddedly engaged in a wall of the engine cylinder 12 to expose the diaphragm to pressure variations within the cylinder in sealed relation to the cylinder via the bushing opening 44.6.

The body 44 preferably has an exterior portion 44.9 of an hexagonal configuration to facilitate such mounting of the body on engine cylinder. Preferably the diaphragm 54 has a central part 54.2 of selected thickness to bear uniformly against a piezoelectric disc 48 across the full surface of the disc but has another portion 54.3 of relatively lesser thickness around the central part providing a preferential flexing location for the diaphragm in response to cylinder pressures. The electronic means 46 are preferably located within the body 44 as shown in FIG. 3 so that they are electromagnetically shielded in common with the piezoelectric means 42 by the metal body. If desired, separate portions of the mounting body mount, the piezoelectric means 42, and the electronic means 46, respectively, and those body portions are adapted to be separated when desired for permitting separate replacement of the piezoelectric or electronic means.

In that arrangement piezoelectric discs 48 are laterally shielded from vibration by the sleeve 56 which also serves to electrically isolate the edges of the discs from the metal body 44. Opposite ends of the discs which are of common polarity are electrically connected to ground for example via the support section 44.3 and the diaphragm 54, respectively, while contact layers on the opposite sides of each disc are connected to the electronic means 46 via the common electrode conductor 50 and the lead 58. The discs are conveniently assembled on the body as described so that the movement of the diaphragm 54 in response to applied pressure forces provides analog output from the piezoelectric means proportional to the applied pressure. The preload force applied to the discs permits the piezoelectric means to provide an output signal which is proportional to subatmospheric pressures which are typically encountered in the cylinder 12 during engine operation.

The electronic means 46 preferably comprises circuit means which are compact, rugged and capable of being manufactured in high volume for automotive applications and the like at suitably low cost. Preferably as is shown in FIG. 3, the electronic means 46 are mounted within a chamber formed by the body bore 44.2 and a chamber cover 60 is secured over that chamber in any conventional manner. The cover preferably has central opening 60.1 and one or more conductive means 62 are separately mounted in the opening by use of electrically insulating glass or phenolic means 62.1 or the like to serve as terminals for the cylinder pressure transmitter 28. The electronic means 46 are electrically connected to the terminal means 62 by Teflon insulated wires 62.2 or the like as shown. Preferably the chamber 44.2 is filled with a potting compound such as a silicone material filled with alumina powder or the like as indicated by stippling 63 to support and electrically isolate the electronic means 46 and to facilitate heat dissipation from the device 28. The electronic means 46 preferably incorporate active and passive components as in FIG. 4 which are each adapted to be operable over a suitably long service life at the relatively high temperatures of about 175° C. or above which are likely to be encountered where the electronic means are carried on the mounting means 44 and are electromagnetically shielded with the piezoelectric pressure sensing means by being enclosed within the mounting means as shown in FIG. 3. In a preferred embodiment, the electronic means 46 comprise hybrid circuit means including a substrate 64 formed of ceramic material or the like such as alumina which is strong and dimensionally stable at the noted 175° C. temperature.

Figure 4:
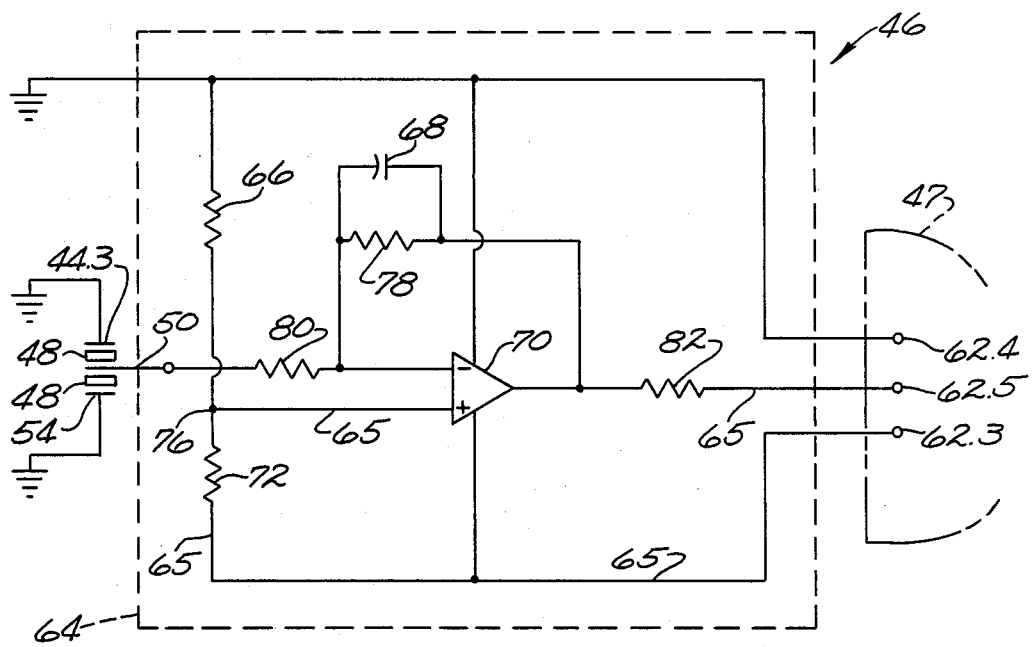
FIG. 4 is a schematic view illustrating a proposed application of the cylinder pressure transmitter of this invention.

Circuit paths 65 formed of silver metal or the like are deposited on the substrate in conventional manner for use at that temperature and resistor means as illustrated at 66 in FIG. 4 preferably comprise known resistor inks or the like suitable for use at that temperature. Typically for example suitable inks comprise silver metal powders or the like dispersed in glass frits or the like which are formed on the substrate and trimmed to desired values in known manner. Such inks include the 5000 Series Inks sold by Electro Materials Corporation of America of Mamaroneck, N.Y. Preferably the capacitor means as indicated at 68 in FIG. 4 comprise tantalum oxide foil means or the like of conventional type which are connected to the noted circuit paths by high temperature solders or epoxies to be suitable for use at the 175° C. temperature. In one preferred embodiment, however, as is described further below the capacitor means embodies ceramic dielectric means having a Curie temperature well above the noted 175° C. temperature, and in one embodient that ceramic material comprises the same material as is embodied in the piezoelectric ceramic discs 48 described above. The active components of the electronic means 46 as illustrated in FIG. 4 by amplifier means 70 are preferably embodied in high temperature integrated circuit means or the like suitable for use at the noted 175° C. temperatures, the i.c. terminals being connected to circuit path means 65 by ball-bonding techniques or high temperature solder means or the like for maintaining the desired temperature capability of the hybrid circuit at 175° C. or above. Preferably for example i.c. units having dielectrically isolated circuit components or the like of conventional type are used. Preferably for example the i.c. units are implemented in DI BIFET technology having two pair of field effect transistors arranged head to head to achieve desired high temperature stability. Alternately the i.c. means are implemented in linear CMOS technology or the like.

In the pressure transmitter as thus described, the high temperature electronic means 46 preferably comprises components as diagramatically illustrated in FIG. 4. That is, a pair of resistors 66, 72, are connected as a voltage divider between the 14 volt automotive power source 62.3 and ground for providing a reference voltage level at juncture 76. That juncture is connected to the positive input terminal of an operational amplifier 70. The output of the piezoelectric discs 48 is connected to the negative input terminal of the amplifier and the RC circuit formed by the capacitor 68 and resistor 78 are also connected from the negative amplifier terminal to the amplifier output. Preferably an additional resistor 80 is inserted between the piezoelectric means and the amplifier to adjust the frequency response characteristic of the circuit and filter out high frequency noise. An output impedance resistor 82 is also preferably provided in the amplifier output for preventing feedback oscillations. In that arrangement, the charge variations provided by the combined piezoelectric discs 48 in response to variation in pressure on the discs is applied to amplifier 70 and to the circuit formed by resistor 78 and by the capacitor means 68 to provide a desired voltage at the negative input terminal of the amplifier 70 and the operational amplifier means 70 acts as a voltage inverter and impedance converter for providing a low impedance output signal varying between 0 and 5 volts at terminals 62.

Figure 5:
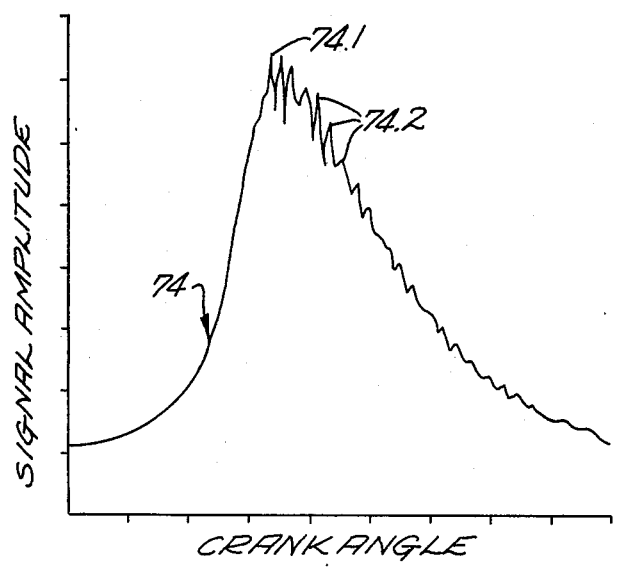
FIG. 5 is a graph diagramatically illustrating the electrical signal provided by the cylinder pressure transmitter of this invention during operation of an internal combustion engine.

In that arrangement, the piezoelectric means 42 and electronic means 46 are both incorporated in the cylinder pressure transmitter 28 to be easily mounted on the engine 10. The piezoelectric means and electronic means are each provided with electromagnetic shielding within the pressure transmitter body and are thereby adapted to provide an amplified, low impedance output signal for reliable transmission to computer control means 47 or other signal process means as indicated in FIG. 4 The piezoelectric means 42 and portions of the electronic means 46 in the transmitter 28 are electrically grounded to the engine through the transmitter mounting means, and terminals 62 further serve to receive power input from the automotive power supply as indicated at 62.3 in FIG. 4, to connect other portions of the electronic means 46 to ground as indicated at 62.4, and to provide the output signal from the cylinder pressure transmitter to the computer means 47 as indicated at 62.5. That is, the cylinder pressure transmitter 28 as thus described provides an analog output signal to the computer means 47 as is indicated by curve 74 in FIG. 5. The signal rises as pressure within the cylinder reaches its peak, as indicated at 74.1, when the piston reaches its maximum torque crank angle during its compression stroke. The signal then falls as the piston moves into its power stroke as will be understood. The transmitted signal also provides a high frequency signal component as indicated at 74.2 in FIG. 5 when knocking combustion occurs in the cylinder. Where the electronic means 46 includes alumina substrate means, where the circuit path means are silver or the like deposited on the substrate, where the resistor means are formed by high temperature thick film means as previously described, and where the capacitor means comprises conventional tantalum oxide capacitor means secured to the circuit conductors by high temperature silver solders or the like, and where the amplifier means comprises a high temperature integrated circuit means as previously described having its terminals connected to the circuit connectors by high temperature resistant ball-bonding or the like, the preferred values for the circuit components are as follows:

| 66 | 6.10K ohms | 78 | 11.3 milliohms |
|---|---|---|---|
| 72 | 12.98K ohms | 80 | 10K ohms |
| 68 | .2 microfarad | 82 | 1K ohms |

Figure 6A:
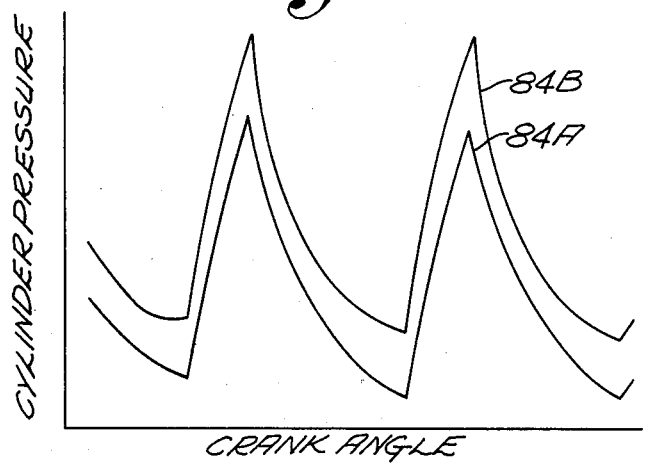
FIGS. 6A–6B are graphs illustrating operation of the pressure transmitter of FIG. 6.
Figure 6B:
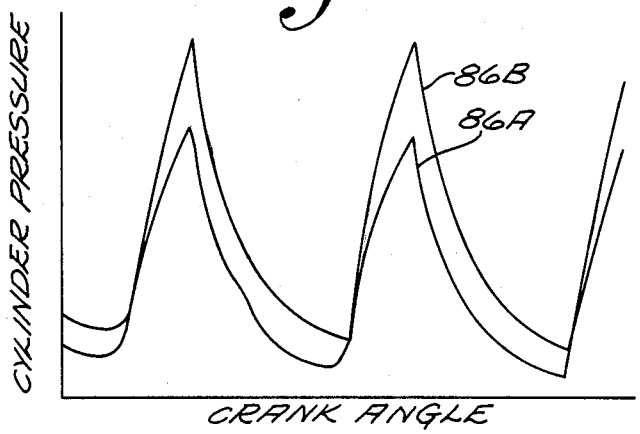

When the piezoelectric cylinder pressure transmitter 28 as thus described was tested in parallel with a known quartz pressure sensor (Kistler Model 601B1) at temperatures of 33° C. and 210° C. as indicated in FIGS. 6A and 6B respectively, the pressure transmitter 28 provided output signals as indicated at 84A and 84B as test pressures were raised to 400 psi. levels and lowered in sequence. The output signals of the piezoelectric pressure transmitters were comparable to the output of the reference sensor (indicated at 86A and 86B in FIGS. 6A and 6B). Where the pressure transmitter 28 was operated at 210° C. while the reference sensor was operated at room temperature, the temperature variation of the output of the transmitter 28 was held within ±10 percent as compared to the reference. The transmitter 28 thus withstood exposure to 210° C. temperatures without significant change.

Where the transmitter 28 was subsequently tested on a 1980 Datsun (Nissan A-Stanza) engine Model NAP-Z20, where the engine was equipped with a Go-Power DA500 series dynamometer and output data for the sensor was collected using a Nicolet Model 40942 digital storage oscilloscope, and where data was obtained after the engine reached normal operating temperature at 1800 RPM with 4 inches of mercury vacuum and 70 foot-pounds of torque and very audible knocking, the output signal from the pressure sensor 28 clearly identified the peak cylinder pressure position and provided a clearly identified high frequency signal component representative of the engine knocking.

Figure 7:
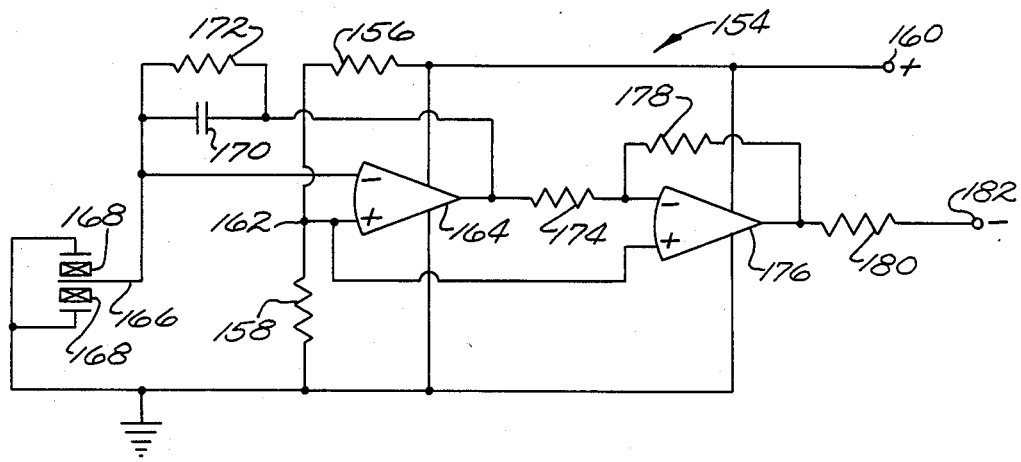
FIG. 7 is a schematic view illustrating another preferred embodiment of the electronic means used in the pressure transmitter of this invention.

In another preferred embodiment, the electronic means incorporated in the transmitter of this invention preferably comprises a hybrid circuit means 154 as schematically illustrated in FIG. 7 corresponding to the electronic means 46 previously described. In the hybrid circuit 154, a pair of resistors 156, 158 are connected as a voltage divider between the 14 volt automotive power source 160 and ground for providing a reference voltage at 162 connected to the positive input terminal of an operational amplifier 164. That amplifier is driven from the 14 volt source and serves as a voltage inverter. The output 166 of the piezoelectric pressure sensing discs diagramatically indicated at 168 is connected to a capacitor 170 and to the negative input of the voltage inverter 164. The capacitor is connected in parallel with the resistor 172 to the output of the voltage inverter. The output of the voltage inverter is connected through the resistor 174 to the negative input terminal of an additional operational amplifier 176 which is further connected to the output of that amplifier through the resitor 178 for amplifying the output of the inverter stage of the circuit. The positive input terminal of the amplifier 176 is connected to the positive input terminal of the inverter 164 as shown. The output of the amplifier 176 (which is driven from 14 volt source) is connected through an output impedance resistor 180 to the output terminal 182 of the circuit 154.

Figure 8:
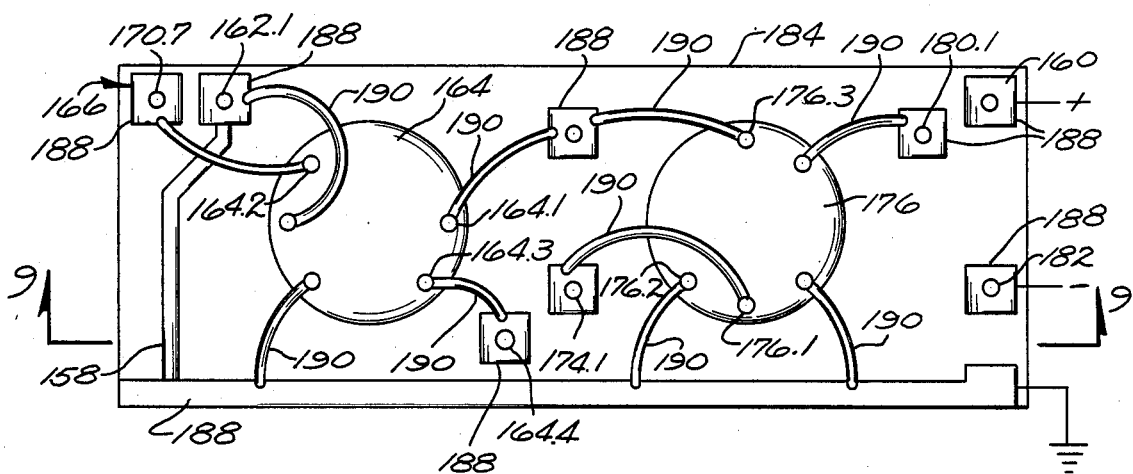
FIG. 8 is a plan view of the electronic circuit unit of FIG. 7 implemented as a high temperature hybrid circuit for use in the cylinder pressure transmitter of this invention.
Figure 9:
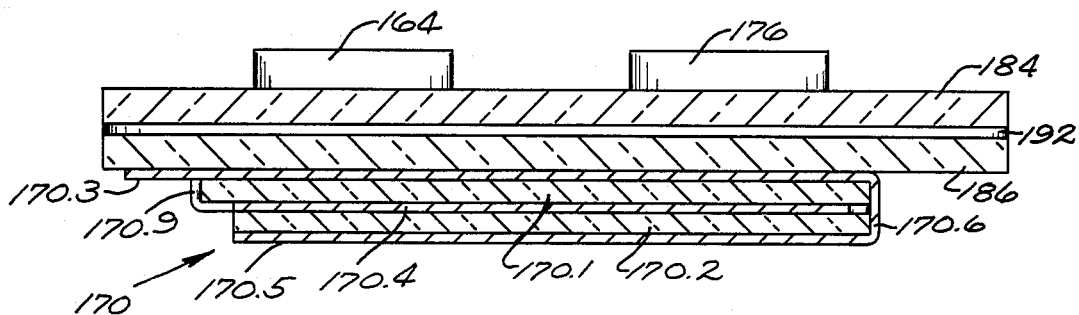
FIG. 9 is a section view along line 9—9 of FIG. 8 and similar to part of FIG. 3 but to greatly enlarged scale illustrating the multiple layer substrate and high temperature capacitor means used in the circuit of FIG. 8.
Figure 10:
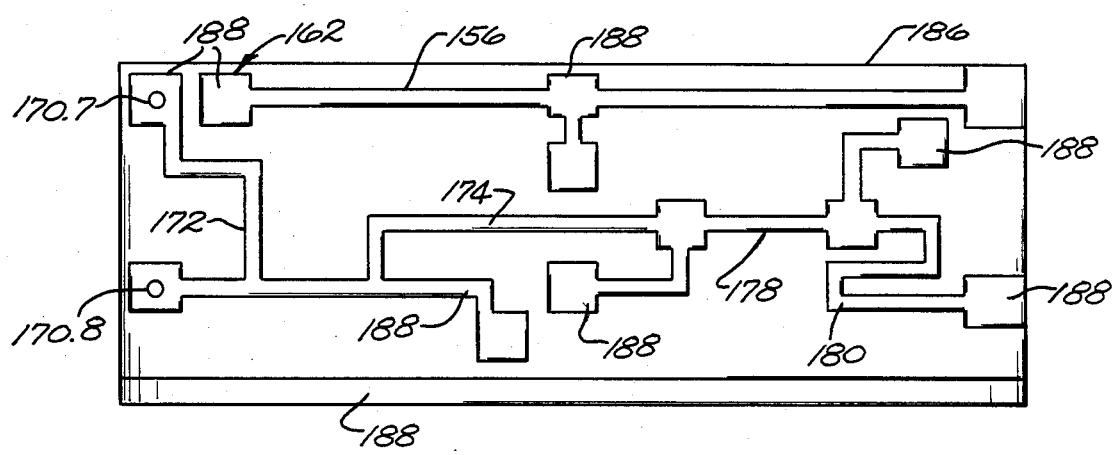
FIG. 10 is a plan view similar to FIG. 8 illustrating circuit components on a second substrate layer of the circuit of FIG. 8.

In accordance with this invention, the hybrid circuit 154 of FIG. 7 has a physical structure as shown in FIGS. 8–10. The hybrid circuit preferably incorporates a pair of alumina substrates 184, 186. (See FIGS. 8–10). Alternately one or an additional number of substrates may be used to accomodate circuit components if desired. Resistors 156, 158, 172, 174, 178 and 180 are formed on the substrates by high temperature thick film resistor means (175° C. or above as previously described) as shown in FIGS. 8 and 10. The operational amplifiers 164 and 176 comprise integrated circuit components which are implemented in the high temperature (175° C. or above) technologies described above and are mounted on the substrate 184 as shown, preferably by use of high temperature solder means or the like (not shown).

In one preferred embodiment, the capacitor 170 preferably comprises one or more layers e.g. 170.1, 170.2 of a ceramic ferroelectric material having a Curie temperature above about 175° C. for retaining suitable dielectric properties up to that temperature.

In that regard, it is found that a novel and particularly improved high temperature capacitor means is achieved in this invention where the dielectric portions of the capacitor means comprise ceramic ferroelectric materials characterized by relatively high Curie temperatures above at least about 125° C. and by being relatively free from thermal ageing to maintain suitably high dielectric constants of about 750 or greater well above that temperature over a useful service life. For use in the hybrid circuit means 154 used in the transmitter of this invention, the ceramic ferroelectric materials in the capacitor 170 are preferably selected from the group consisting of lead-based titanates, stannates and zirconates and lead- and sodium-based niobates having Curie temperatures above about 175° C. which are adapted to maintain dielectric constants of about 750 or more at least up to that temperature level. For example, the ceramic ferroelectric materials used in the capacitor means 170 of this invention comprise known materials as described in U.S. Pat. No. 3,983,077 which incorporate from at least about one mole percent lead up to 100 mole percent lead (or which have about 1 mole percent lead up to 100 mole percent lead substituted for the barium, strontium, or calcium in the materials therein described) for achieving the desired Curie temperatures and dielectric constants, each mole percent of lead in such compositions tending to increase the Curie temperature of the described materials by about 4° C. Other known ceramic ferroelectric materials providing the desired high Curie temperatures and high dielectric constants at those temperatures are also used in the novel capacitor means of this invention.

In one preferred embodiment of the invention, the ceramic layers 170 are formed of the lead-based zirconate-titanate piezoelectric material incorporated in the piezoelectric discs 48 as above described. That described material incorporated 100 mole percent lead, has a Curie temperature of 370° C., and maintains a dielectric constant well above 750 up to that temperature level. However corresponding materials with barium or the like substituted for at least part of the noted lead content are also useful in the capacitor means within the scope of this invention. Alternately, the ceramic ferroelectric layers 170.1, 170.2 are formed of the exemplary lead niobate piezoelectric material described above. That known piezoelectric material incorporates 100 mole percent lead, has a Curie temperature of about 570° C. and maintains a dielectric constant of above 750 up to that temperature level. However barium or the like is also substituted for part of that noted lead content within the scope of this invention. In another preferred embodiment of the invention, the ceramic ferroelectric material used in the capacitor 170 comprises a sodium-based niobate having an empirical composition, $Na_{.75}Cd_{.25}NbO_3$. Such a material has a Curie temperature of about 210° C. and other comparable sodium-based niobate materials are also useful in accordance with this invention.

In the preferred embodiment of the circuit 154 of this invention, the two ceramic layers 170.1, 170.2 are superimposed on each other on a conductive metal electrode coating layer 170.3 provided on one side of the substrate 186, are separated by an electrode layer 170.4 of conductive metal material coating most of the interface between the layers, and are covered on the outer surface of the superimposed pair of layers by an additional electrode layer 170.5, the layers 170.3, 170.5 being connected by a metal jumper band 170.6 of the coating metal. Those electrode layers are connectd to via 170.8 in the substrate 186, and the separating electrode coating 170.4 is connected as indicated 170.9 in FIG. 9 to the via 170.7 which further extends through the substrate layer 186 (see FIG. 10). Circuit conductors or pads 188 are provided on the substrates 184 and 186 as indicated in FIGS. 8 and 10 and the wires 190 are ball-bonded or the like to the conductors and to the component terminals to interconnect the circuit components for use at 175° C. or above. Thus the positive input terminal 164.1 of the amplifier 164 is connected to the juncture 162 which is formed between the resistors 156 and 158 by via 162.1 in the substrate 184. The negative input terminal 164.2 of that amplifier is connected to the capacitor 170, to the resistor 172, and to the piezoelectric means 168 through via 170.7 (see FIGS. 8 and 10 and see the piezoelectric output connector pad 166 in FIG. 8). The capacitor 170 and the resistor 172 are connected to the resistor 174 and to the output 164.3 of the amplifier 164 by via 164.4. The negative input terminal 176.1 of the second amplifier is connected to the resistor 174 and resistor 178 by via 174.1 while the positive input terminal 176.2 is connected to ground. The resistor 178 and 180 are connected to the output 176.3 of the second amplifier through via 180.1. The substrates 184 and 186 are preferably secured in their superimposed relation as indicated in FIG. 9 by electrically insulating, high temperature (175° C. or above) adhesive means or the like as indicated diagramatically in FIG. 9 at 192.

In that arrangement, the hybrid electronic means 154 is of compact, rugged and relatively inexpensive structure and is adapted to operate at the temperatures likely to be encountered when incorporated in cylinder pressure transmitter devices of this invention as above described.

It can be seen that the cylinder pressure transmitters of this invention have structures such that they are adapted for convenient and reliable use over a long service life. The piezoelectric means incorporated in the pressure transmitter are adapted to provide initial signals of relatively low impedance and those signals are properly shielded from electromagnetic interference and amplified to provide signals which are reliably representative of variations in cylinder pressure during engine operation and which are further adapted to be transmitted to computer control means or the like at a location remote from the engine cylinders. The pressure transmitters are also of simple, rugged and reliable construction.

It will be further understood that the preferred embodiments of this invention as described above can be varied in many ways while still remaining within the scope of the present invention. For example, the configuration of the housing means can be modified in various ways and fin means can be provided on the device to facilitate heat dissipation where desired. It should be understood that this invention includes all modifications and equivalents of the disclosed embodiments falling within the scope of the appended claims.

I claim:

1. A device for providing an electrical signal to a remote location corresponding to pressure in a cylinder of an internal combustion engine during engine operation comprising a piezoelectric element for generating an electrical signal in response to application of pressure, and means for mounting the piezoelectric element at the location of a cylinder of an internal combustion engine to be responsive to variations of pressure in the cylinder during engine operation, characterized in that the piezoelectric element is ceramic; in that the mounting means comprise a metal body having a bore at one end of the body and a metal diaphragm means for protecting the piezoelectric element from the environment in an internal combustion engine cylinder while transmitting pressure force to the piezoelectric element, the bore being open at one bore end and having a support section of the body positively located on the body at an opposite bore end and receiving the piezoelectric element, and the metal diaphragm means being disposed in a selected position on the body for closing the open bore end and compressing the ceramic piezoelectric element against the metal body support section with a selected preload compressive force and being welded to the body to secure the diaphragm means in said selected position, the mounting means having screw threads threadly attachable to an engine for disposing the diaphragm means compressing said piezoelectric element in sealed relation to a cylinder of an internal combustion engine to be accessible to pressure in the cylinder and to be responsive to variations of pressure including subatmospheric variations of pressure in the cylinder during engine operation to generate an initial electrical signal in the piezoelectric element accurately representative of pressure in the cylinder; and in that electronic means having active and passive components which include a capacitor are operable at the relatively high temperature likely to be encountered at a location immediately adjacent a cylinder of an internal combustion engine during engine operation and are carried on the metal body of the mounting means to be disposed at such an adjacent location, the electronic means being electrically connected to the piezoelectric element for receiving and amplifying said initial electrical signal at such a location on the mounting means, the piezoelectric element and said electronic means and the electrical connection therebetween being electromagnetically shielded on the mounting means to facilitate accurate conditioning of the initial electrical signal for accurate transmission to a location remote from the engine cylinder.

2. A cylinder pressure transmitter for providing an electrical signal to a remote location corresponding to pressure in a cylinder of an internal combustion engine comprising a ceramic piezoelectric element; mounting means including a metal body having a bore at one end of the body and a metal diaphragm means for protecting the piezoelectric element from the environment in an internal combustion engine cylinder while transmitting pressure force to the piezoelectric element, the bore being open at one bore end and having a support section of the body disposed at an opposite bore end and receiving the ceramic piezoelectric element, and the metal diaphragm means being disposed in a selected position on the body for closing the open bore end and compressing the piezoelectric element against the support section with a selected preload force and being welded to the body to secure the diaphragm means in said selected position, the mounting means having screw threads threadedly attachable to an internal combustion engine for mounting the diaphragm means compressing the piezoelectric element in sealed relation to a cylinder of the engine to be accessible to cylinder pressure and responsive to a pressure force applied to the piezoelectric element from within the cylinder through said diaphragm means so that the piezoelectric element provides an initial electrical signal corresponding to variations of the pressure including subatmospheric pressure within the cylinder during engine operation; and electronic means having active and passive components including a capacitor which are carried on the body connected to the piezoelectric element and are operable at the relatively high temperatures of about 175° C. likely to be encountered at said location adjacent an engine cylinder for receiving and amplifying said initial electrical signal for transmission to a location remote from the piezoelectric element, the mounting means having means electromagnetically shielding the piezoelectric element, the electronic means, and the connection therebetween on the mounting means to facilitate accurate conditioning of the initial electrical signal to permit improved transmission of the amplified signal to said remote location.

3. A cylinder pressure transmitter for providing an electrical signal to a remote location corresponding to pressure in a cylinder of an internal combustion engine comprising a ceramic piezoelectric element; mounting means including a metal body having a bore at one end of the body and a metal diaphragm means for protecting the piezoelectric element from the environment in an internal combustion engine cylinder while transmitting pressure force to the piezoelectric element, the bore being open at one bore end and having a support section of the body disposed at an opposite bore end and receiving the ceramic piezoelectric element, and the metal diaphragm means being disposed in a selected position on the body for closing the open bore end and compressing the piezoelectric element against the support section with a selected preload force and being welded to the body to secure the diaphragm means in said selected position, the mounting means having screw threads threadedly attachable to an internal combustion engine for mounting the diaphragm means compressing the piezoelectric element in sealed relation to a cylinder of the engine to be accessible to cylinder pressure and responsive to a pressure force applied to the piezoelectric element from within the cylinder through said diaphragm means so that the piezoelectric element provides an initial electrical signal corresponding to variations of the pressure including subatmospheric pressure within the cylinder during engine operation; and electronic means having active and passive components including a capacitor which are carried at a selected location on the body connected to the piezoelectric element and are operable at relatively high temperatures of about 175° C. likely to be encountered at said location adjacent an engine cylinder for receiving and amplifying said initial electrical signal for transmission to a location remote from the piezoelectric element, the mounting means having means electromagnetically shielding the piezoelectric element, the electronic means, and the connection therebetween on the mounting means to facilitate accurate conditioning of the initial electrical signal to permit improved transmission of the amplified signal to said remote location, wherein the piezoelectric element provides a charge output signal in response to application of said pressure force to the piezoelectric element and wherein the electronic means carried by the body comprises a hybrid circuit including a high temperature capacitor selected from the group consisting of a tantalum oxide capacitor and a ceramic dielectric capacitor having ceramic dielectric components with a Curie temperature above about 175° C. and a high temperature integrated circuit selected from the group consisting of CMOS and DIBIFET integrated circuits having dielectrically isolated circuit components to provide an amplified signal of selected voltage corresponding to the cylinder pressure.

4. A cylinder pressure transmitter for providing an electrical signal to a remote location corresponding to pressure in a cylinder of an internal combustion engine comprising a ceramic piezoelectric element; mounting means including a metal body having a first bore at one end of the body and a second bore at an opposite end of the body and a metal diaphragm means for protecting the piezoelectric element from the environment in an internal combustion engine, the first bore being open at one bore end and having a support section of the disposed at an opposite end of the first bore and receiving the ceramic piezoelectric element, and the metal diaphragm means being disposed in a selected position on the body for closing the open end of the first bore and compressing the piezoelectric element against the support section of the body with a selected preload force and being welded to the body to secure the diaphragm means in said selected position, the mounting means having screw threads threadedly attachable to an internal combustion engine for mounting the body in selected heat transfer relation to the engine and for mounting the diaphragm means with the piezoelectric element compressed thereunder in sealed relation to a cylinder of the engine to be accessible to and responsive to a pressure applied to the piezoelectric element from within the engine cylinder through said diaphragm means so that the piezoelectric element provides an initial electrical signal corresponding to variations of the pressure including subatmospheric pressure within the cylinder during engine operation; and electronic means mounted on the body in the second and means electrically connecting the electronic means to the piezoelectric element in the first bore for receiving and amplifying said initial electrical signal for transmission to a location remote from the piezoelectric element, the electronic means comprising a high temperature capacitor selected from the group consisting of a tantalum oxide capacitor and a ceramic dielectric capacitor having ceramic dielectric components with a Curie temperature of about 175° C. and a high temperature integrated circuit selected from the group consisting of CMOS and DIBIFET integrated circuits having dielectrically isolated circuit components to be operable at the relatively high temperature of about 175° C. likely to be encountered at said second bore immediately adjacent an engine cylinder, the piezoelectric element, electronic means and means for electrical connection therebetween being electromagnetically shielded within the metal body to facilitate accurate conditioning of the initial electrical signal to permit improved transmission of the amplified signal to said remote location.

5. A cylinder pressure sensing system for regulating operation of an internal combustion engine comprising a cylinder pressure sensor device having a piezoelectric element for generating an electrical signal in response to application of pressure force, having diaphragm means at one device and for shielding the piezoelectric element from a fluid pressure environment while transmitting fluid pressure force to the piezoelectric element, and having means for mounting the piezoelectric element and the diaphragm means at the location of a cylinder of an internal combustion engine to expose the diaphragm means to pressure in the cylinder so that the piezoelectric element is responsive to variations of pressure in the engine cylinder during engine operation to provide initial electrical signals corresponding to said cylinder pressure, and computer means disposed at a location relatively remote from said engine cylinder electrically connected to the pressure sensor device to be responsive to electrical signals from the pressure sensor device for regulating operation of the internal combustion engine in accordance with the cylinder pressure variations, characterized in that the pressure sensor device has screw threads at said one device end to be threadedly engaged with the engine for mounting the device in sealed relation to the engine cylinder, has a metal body and has said piezoelectric element formed of a ceramic material and mounted on said body with a selected spacing from said one device end to be operable at the relatively high temperature likely to be encountered at the engine cylinder, said body having a portion adjacent an opposite end of the device with selected greater spacing from the diaphragm means to be at a selected temperature when the pressure sensor device is mounted at the engine cylinder location, and has electronic means mounted on the body and electrically connected to the piezoelectric element for amplifying and otherwise conditioning the initial electrical signals to improve transmission thereof to the computer means at said relatively remote location, the electronic means being operable at said selected temperature and being mounted on the pressure sensor device body at said body portion adjacent the opposite end of the device spaced from the diaphragm means to be operated on the device at said selected temperature while the pressure sensor device is mounted at the location of the engine cylinder, the pressure sensor device body having means electromagnetically shielding the piezoelectric element, the electronic means and the electrical connection between the piezoelectric element and electronic means for improving transmission of said signals to the computer means.

* * * * *